United States Patent [19]
Goto et al.

[11] Patent Number: 5,702,782
[45] Date of Patent: Dec. 30, 1997

[54] TWO LAYER EXTRUSION MOLDING

[75] Inventors: Shinichi Goto; Masao Kobayashi; Yasuhisa Kuzuya; Hidehito Ichikawa, all of Aichi, Japan

[73] Assignee: Toyoda Gosei Co., Ltd., Nishikasugai-gun, Japan

[21] Appl. No.: 700,580

[22] Filed: Aug. 14, 1996

Related U.S. Application Data

[63] Continuation of Ser. No. 329,311, Oct. 26, 1994, abandoned.

[30] Foreign Application Priority Data

Oct. 29, 1993 [JP] Japan ............... HEI 5-272045

[51] Int. Cl.$^6$ ................................................ B32B 23/08
[52] U.S. Cl. ...................... 428/31; 428/518; 428/522
[58] Field of Search ........................ 428/31, 518, 522

[56] References Cited

U.S. PATENT DOCUMENTS

| | | | |
|---|---|---|---|
| 5,122,213 | 6/1992 | Figge, Sr. | 156/222 |
| 5,124,196 | 6/1992 | Figge, Sr. | 428/246 |
| 5,143,764 | 9/1992 | Rosen | 428/36.5 |
| 5,223,194 | 6/1993 | Rosen | 264/46.1 |
| 5,431,191 | 7/1995 | Neuhauser et al. | 138/137 |

*Primary Examiner*—W. Robinson H. Clark
*Attorney, Agent, or Firm*—Cushman, Darby & Cushman IP Group of Pillsbury Madison & Sutro LLP

[57] ABSTRACT

In a two layer extrusion molding, a core part 11 is formed of hard resin material, a crease pattern 11a having a given depth, preferably, a depth in the range of 10 to 20 μm is formed on the surface of the core part 11, and a skin part 12 formed of soft resin material is coated on the surface of the core part 11. Thus, the core part and skin part are effectively prevented from being detached from each other to thereby improving the quality of the molded product.

4 Claims, 2 Drawing Sheets

TWO LAYER EXTRUSION MOLDING

This is a continuation of application Ser. No. 08/329,311, filed on Oct. 26, 1994, which was abandoned upon the filing hereof.

The priority application, Japanese Patent Application No. Hei 5-272045 filed in Japan on Oct. 29, 1993, is hereby incorporated into the present specification by this reference.

BACKGROUND OF THE INVENTION

The present invention relates to a two layer extrusion molding and, in particular, to a two layer extrusion molding suitable for a side molding for a vehicle or the like including a core part and a skin part coated on the surface of the core part.

As a conventional two layer extrusion molding of this type, there is available a side molding for a vehicle which is shown in FIG. 3.

FIG. 3 is a sectional view of a conventional side molding for a car and FIG. 4 is a sectional view of the conventional side molding for a car, showing a state thereof in which a core part and a skin part are detached in part from each other.

In FIGS. 3 and 4, the side molding for a car includes a core part 51 formed of hard resin material and a skin part 52 formed of soft resin material and coated on the outer surface of the core part 51. This car side molding is referred to as a two layer molded side molding. To manufacture the two layer side molding, after hard resin material is extrusion molded from an extrusion molding machine for molding the core part 51 to thereby produce the core part 51, the core part 51 is cooled and is inserted into an extrusion molding machine for molding the skin part 52, soft resin material is coated on the smooth surface of the core part 51, and the two layer molding is extruded from the latter extrusion molding machine.

The conventional car side molding of two layer extrusion molding is structured in the above-mentioned manner and, after the core part 51 is cooled, the skin part 52 is coated on the smooth outer surface of the core part 51. Therefore, sufficiently strong adhesion cannot be obtained between the core part 51 and skin part 52 and, as shown in FIG. 4, there is a possibility that the core part 51 and skin part 52, respectively formed of different materials, can be detached in part from each other to thereby produce a gap 53 therebetween. Especially, since the outer surface of the core part 51 is a smooth surface, for example, when the skin part 52 is given an external force exerting toward the surface thereof, the skin part 52 can be slid along the smooth surface of the core part 51 and lose touch with the core part 51. Further, if such detachment occurs on the surface side of the car side molding which serves as the design surface of a car, then there is a possibility that it can mar the appearance quality of the product or the side molding. In view of this, there can be expected a method in which the core part 51 is preliminarily heated before it is inserted into the extrusion head of the extrusion molding machine for molding the skin part 52 to thereby increase its adhesion strength to the skin part 52. However, in this case, the core part 51 can be softened and thus can be deformed due to the resin pressure within the extrusion head or other problems can arise. Also, since there is required additionally a step of preliminarily heating the core part 51, the overall manufacturing cost of the car side molding is undesirably increased.

SUMMARY OF THE INVENTION

Accordingly, it is an object of the invention to provide a two layer extrusion molding which is improved in the adhesion strength between a core part and a skin part to thereby prevent the two parts from being detached from each other.

The two layer extrusion molding according to the invention includes a core part formed of hard resin material and a skin part coated on the surface of the core part and formed of soft resin material, while a crease pattern of a given depth is formed on the surface of the core part.

According to the invention, the crease pattern formed on the core part surface increases the surface area of the core part to increase its contact area with the skin part and thereby improve its adhesion strength with respect to the skin part. Also, when an external force is applied to the skin part in the surface direction thereof, the crease pattern acts in a direction to resist the external force.

DETAILED DESCRIPTION OF THE PREFERRED EMBODIMENT OF THE INVENTION

Description will be given hereinbelow of an embodiment of a side molding for a car according to the present invention.

Figure 1:
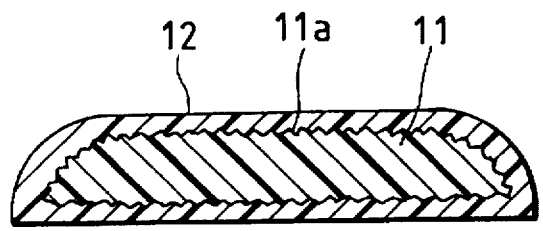
FIG. 1 is a sectional view of a car side molding as a two layer extrusion molding according to an embodiment of the invention.
Figure 2:
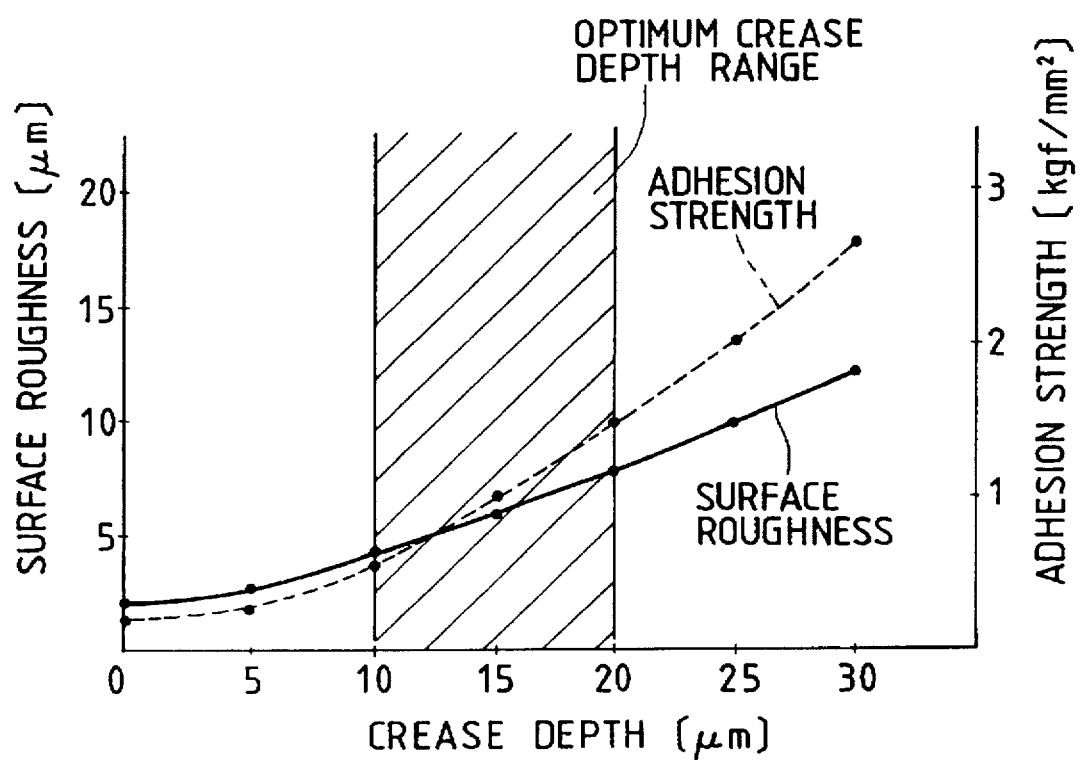
FIG. 2 is a graph depicting a relation between crease depth, surface roughness and close adhesion strength in a two layer extrusion molding according to an embodiment of the invention.
Figure 3:
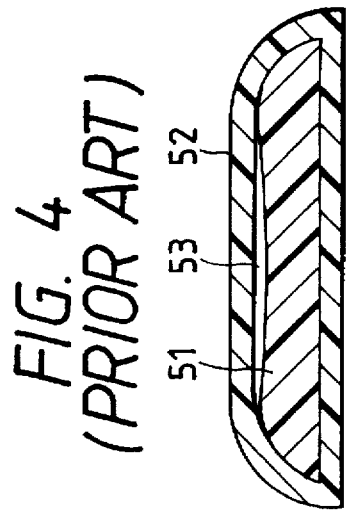
FIG. 3 is a sectional view of a conventional car side molding.
Figure 4:
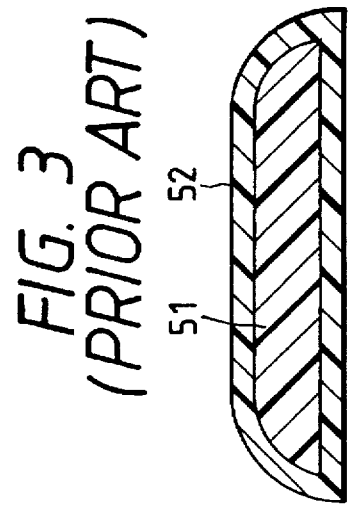
FIG. 4 is a sectional view of the conventional car side molding, showing the detachment between the core part and skin part of the side molding.

In FIG. 1, there is shown a sectional view of a side molding for a car as a two layer extrusion molding according to an embodiment of the invention. In FIG. 2, there is shown a graphical representation of a relation between crease depth, surface roughness and adhesion strength in the two layer extrusion molding according to the embodiment of the invention.

In FIG. 1, the present embodiment is formed as a side molding for a car and the car side molding, similarly to the conventional car side molding, includes a core part 11 formed of hard resin material and a skin part 12 coated on the surface of the core part 11 and formed of soft resin material. As the hard resin material of the core part 11, for example, hard polyvinyl chloride (PVC) or other hard synthetic resin can be used, while as the soft resin material of the skin part 12, for example, soft polyvinyl chloride (PVC) can be used. On the whole surface of the core part 11, there is formed a crease pattern 11a of a given depth. The crease pattern 11a can be formed by a well-known crease working operation, for example, it may be formed as a one-dimensional crease pattern 11a which extends linearly in one direction of the core part 11, for example, in the longitudinal direction, width direction or any other direction of the core part 11, or it may be formed as a two-dimensional crease pattern 11a which is composed of a large number of uneven portions disposed successively in the surface direction of the core part 11.

Further, the depth of the crease pattern 11a can be determined in consideration of various conditions such as the thickness of the car side molding as the final product, the thickness of the skin part 12 and the like. Normally, the depth of the crease pattern 11a may be in the range of 5 to 25 μm and, preferably, in the range of 10 to 20 μm. As shown in FIG. 2, if the crease depth of the crease pattern 11a is less than 5 μm, then an increase in the contact area between the core part 11 and skin part 12 is not sufficient and, therefore, the adhesion strength between the core part 11 and skin part 12 is less than about 0.3 kgf/mm$^2$ and a sufficient adhesion strength cannot be expected. On the other hand, if the crease depth is more than 25 μm, then the adhesion strength is increased but the surface roughness of the core part 11 exceeds 10 μm, so that the crease pattern 11a appears on the surface of the skin part 12, which can have ill effects on the appearance quality of the product or car side molding.

Figure 5:
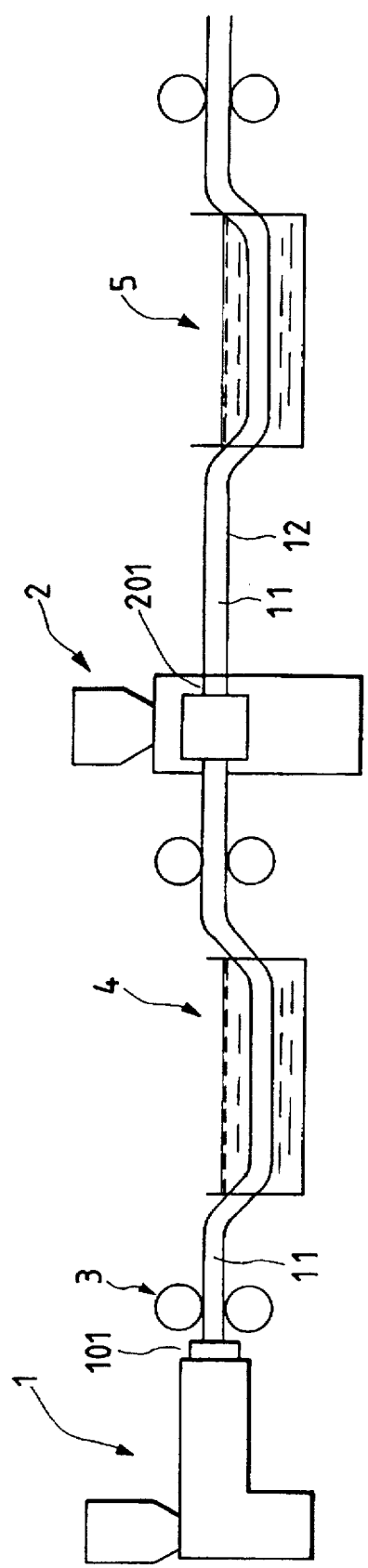
FIG. 5 is a schematic diagram showing a manufacturing process of the two layer extrusion molding of the invention.

Next, a process to manufacture the two layer extrusion molding having the above structure is described with reference to FIG. 5. At first, the core part 11 formed of a given hard resin material is extruded from an extrusion head 101 of an extrusion molding machine 1 for the core part 11, and the whole surface of the core part 11, which is in a heated and softened condition just after it is extruded, is pressed by crease rolls 3 disposed just behind the extrusion head 101 and is thereby creased. Then, the thus creased core part 11 is cooled by a cooling device 4 and is inserted into an extrusion head 201 of an extrusion molding machine for 2 the skin part 12, a given soft resin material is coated on the surface of the core part 11, and the core part 11 and skin part 12 are extruded from the extrusion head 201 and are then cooled by a cooling device 5, thereby producing a car side molding with the skin part 12 coated on the surface of the core part 11. Alternatively, after the core part 11 is extrusion molded and is creased, the core part 11 may be wound around a take-up roll. Next, the wound core part 11 may be inserted into the extrusion head 201 of the extrusion molding machine 2 so that the skin part 12 can be coated on the surface of the core part 11.

According to the car side molding manufactured in this manner, the crease pattern 11a on the surface of the core part 11 increases the surface area of core part 11 to increase the contact area of the core part 11 with the skin part 12, thereby increasing the adhesion strength of the core part 11 with respect to skin part 12. Also, when an external force is applied to the skin part 12 in the surface direction thereof, the three-dimensional crease pattern 11a having a given depth acts in a direction to resist the external force thereby preventing the skin part 12 from being detached from the core part 11.

As described above, the two layer extrusion molding according to the above embodiment comprises the core part 11 formed of hard resin material and including on the surface thereof the crease pattern 11a having a depth of 5 to 25 μm, and the skin part 12 formed of soft resin material and coated on the outer surface of the core part 11.

Therefore, according to the above embodiment, the crease pattern 11a provided on the entire surface of the core part 11 increases the surface area over the whole surface of the core part 11, increases the contact area of the core part 11 in the contact portions thereof with the skin part 12, and thus enhances the adhesion strength with respect to the skin part 12. As a result, even when the skin part 12 is coated on the cooled core part 11, the core part 11 and skin part 12 formed of different materials are prevented from being detached from each other. Also, even if an external force is applied to the skin part 12 in the surface direction thereof, the crease pattern 11a in the core part 11 acts in a direction to resist the external force to thereby restrict the movement of the skin part 12 in the surface direction thereof, which eliminates the possibility that the skin part 12 can slide along the surface of the core part 11 to be detached from the core part 11.

When the crease depth is set in the range of 10 to 20 μm, while there is eliminated the inconvenience that the crease pattern 11a can appear on the surface of the skin part 12 to have an adverse effect on the appearance quality of the product, the adhesion area between the core part 11 and skin part 12 can be increased sufficiently and thus the adhesion strength thereof can be enhanced to a great extent. As a result, the above embodiment, without affecting the appearance quality of the product adversely, prevents effectively the core part 11 and skin part 12 from being detached from each other and improves the quality of the resulting product.

In the above embodiment, the skin part 12 is coated on the cooled core part 11. However, it can be appreciated that but the skin part 12 can be coated on the core part 11 after the core part 11 is heated preliminarily, when comparing and considering synthetically the product quality such as prevention of detachment of the skin part 12 or the like and the manufacturing cost or the like. In this case, the invention can further increase the adhesion strength between the core part 11 and skin part 12 to thereby prevent the detachment of the skin part 12 more effectively and also to enhance the quality of the product.

Also, although in the above embodiment the crease pattern 11a is formed on the entire surface of the core part 11, the crease pattern 11a can be formed on only part of the surface of the core part 11 as long as the adhesion strength of a desired value or greater between the core part 11 and skin part 12 can be secured and thus the quality of the product can be maintained sufficiently.

As has been described heretofore, the two layer extrusion molding according to the invention includes the core part formed of hard resin material and the skin part formed of soft resin material and coated on the surface of the core part, while the crease pattern having a given depth is formed on the surface of the core part. According to this structure, the crease pattern formed on the surface of the core part increases the surface area of the core part to increase the contact area of the core part with the skin part, thereby improving the adhesion strength of the core part with respect to the skin part. Also, when an external force is applied to the skin part in the surface direction thereof, the crease pattern acts in a direction to resist the external force. As a result of this, the core part and skin part are effectively prevented from being detached from each other, so that the quality of the product can be improved.

What is claimed is:

1. A side-molding for use in a vehicle, said side molding being made by a two layer extrusion molding, said side molding comprising:

a core element formed of resin material having a first degree of hardness, said core including an outer surface provided with an adhesion enhancing, axially extending pattern having a depth ranging between about 5 to 25 μm and an exterior skin formed on the outer surface of said core of resin material having a degree of hardness less than said first degree of hardness.

2. A two layer extrusion molding as claimed in claim 1, wherein said pattern is formed in the entire outer surface of said core.

3. A two layer extrusion molding as claimed in claim 1, wherein the depth of said pattern a ranges between 10 μm to 20 μm.

4. A side molding for use in a vehicle, said side molding being made by a two layer extrusion molding, said side molding comprising:

a core element formed of hard polyvinyl chloride resin material having a first degree of hardness, said core including an outer surface provided with an adhesion enhancing, axially extending pattern having a depth ranging between about 5 to 25 µm; and an exterior skin formed on the outer surface of said core element of soft polyvinyl chloride resin material having a degree of hardness less than said first degree of hardness.

\* \* \* \* \*